US008717231B1

(12) United States Patent
Harris (10) Patent No.: US 8,717,231 B1
(45) Date of Patent: *May 6, 2014

(54) POSITION PRIVACY IN AN ELECTRONIC DEVICE (75) Inventor: Scott C. Harris, Rancho Santa Fe, CA (US)

(73) Assignee: Platt Technology Investments LLC, Dover, DE (US)

( * ) Notice: Subject to any disclaimer, the term of this patent is extended or adjusted under 35 U.S.C. 154(b) by 495 days.

This patent is subject to a terminal disclaimer.

(21) Appl. No.: 12/902,042

(22) Filed: Oct. 11, 2010

Related U.S. Application Data (60) Continuation of application No. 11/778,065, filed on Jul. 15, 2007, now Pat. No. 7,817,085, which is a continuation of application No. 10/714,096, filed on Nov. 14, 2003, now Pat. No. 7,327,312, which is a division of application No. 09/682,600, filed on Sep. 25, 2001, now Pat. No. 6,700,534, which is a continuation-in-part of application No. 09/690,001, filed on Oct. 16, 2000, now Pat. No. 6,473,031.

(51) Int. Cl.
*G01S 19/38* (2010.01)
*G01S 19/42* (2010.01)

(52) U.S. Cl.
USPC ............................ 342/357.21; 342/357.25

(58) Field of Classification Search
USPC ............ 342/357.21, 357.25, 357.4, 357.75; 701/409, 412, 426, 468; 455/404.2, 455/456.1
See application file for complete search history.

(56) References Cited

U.S. PATENT DOCUMENTS

| | | |
|---|---|---|
| 4,445,118 A | 4/1984 | Taylor et al. |
| 5,222,245 A | 6/1993 | Ando |
| 5,301,368 A | 4/1994 | Hirata |
| 5,334,974 A | 8/1994 | Simms et al. |
| 5,491,745 A | 2/1996 | Roeder |
| 5,543,802 A | 8/1996 | Villevieille et al. |
| 5,699,255 A | 12/1997 | Ellis et al. |
| 5,726,660 A | 3/1998 | Purdy |
| 5,731,785 A | 3/1998 | Lemelson |
| 5,751,373 A | 5/1998 | Ohyama et al. |
| 5,894,276 A | 4/1999 | Altidor et al. |
| 5,918,224 A | 6/1999 | Bredenberg |
| 5,926,118 A | 7/1999 | Hayashida et al. |
| 5,940,753 A | 8/1999 | Mallinchkrodt |
| 5,944,768 A | 8/1999 | Ito et al. |
| 5,964,821 A | 10/1999 | Brunts et al. |
| 5,969,678 A | 10/1999 | Stewart |
| 6,049,718 A | 4/2000 | Stewart |
| 6,069,570 A | 5/2000 | Herring |
| 6,069,760 A | 5/2000 | Yun |
| 6,085,090 A | 7/2000 | Yee et al. |
| 6,107,960 A | 8/2000 | Krasner |
| 6,121,922 A | 9/2000 | Mohan |

(Continued)

OTHER PUBLICATIONS

International Search Report mailed Jul. 31, 2002, PCT Application No. PCT/US01/31947, filed Oct. 12, 2001, 1 page.

(Continued)

*Primary Examiner* — Dao Phan
(74) *Attorney, Agent, or Firm* — Stolowitz Ford Cowger LLP (57) ABSTRACT

A privacy enhancement device for electronic device such as a cellular telephone. The privacy enhancement device may include a jammer which may produces false information, e.g. false information indicative of pseudo ranges. In addition, the navigation information used on the position detecting device may be locally stored versions of dynamically changing information. The navigation operation may be carried out using a Web service.

25 Claims, 4 Drawing Sheets

(56) References Cited

U.S. PATENT DOCUMENTS

| | | |
|---|---|---|
| 6,204,808 B1 | 3/2001 | Bloebaum et al. |
| 6,222,484 B1 | 4/2001 | Seipie et al. |
| 6,226,589 B1 | 5/2001 | Maeda et al. |
| 6,311,069 B1 | 10/2001 | Havinis et al. |
| 6,320,496 B1 | 11/2001 | Sokoler et al. |
| 6,321,158 B1 | 11/2001 | DeLorme |
| 6,374,179 B1 | 4/2002 | Smith et al. |
| 6,414,635 B1 | 7/2002 | Stewart |
| 6,429,812 B1 | 8/2002 | Hoffberg |
| 6,437,735 B1 | 8/2002 | McMahan |
| 6,453,237 B1 | 9/2002 | Fuchs |
| 6,473,031 B1 | 10/2002 | Harris |
| 6,484,093 B1 | 11/2002 | Ito et al. |
| 6,505,048 B1 | 1/2003 | Moles et al. |
| 6,525,768 B2 | 2/2003 | Obradovich |
| 6,675,017 B1 | 1/2004 | Zellner et al. |
| 6,687,504 B1 | 2/2004 | Raith |
| 6,697,731 B2 | 2/2004 | Takayama |
| 6,700,534 B2 | 3/2004 | Harris |
| 6,757,545 B2 | 6/2004 | Nowak et al. |
| 6,769,010 B1 | 7/2004 | Knapp et al. |
| 6,812,888 B2 | 11/2004 | Drury |
| 6,983,203 B1 | 1/2006 | Wako |
| 7,013,150 B2 | 3/2006 | Okanoue |
| 7,031,983 B2 | 4/2006 | Israni et al. |
| 7,327,312 B1 | 2/2008 | Harris |
| 7,460,066 B2 | 12/2008 | Ikeda |
| 7,551,128 B2 | 6/2009 | Harris |
| 7,642,955 B2 | 1/2010 | Harris |
| 7,817,085 B2 | 10/2010 | Harris |
| 2001/0018663 A1 | 8/2001 | Dussell et al. |
| 2001/0026240 A1 | 10/2001 | Neher |
| 2002/0070890 A1 | 6/2002 | Harris |
| 2002/0077905 A1 | 6/2002 | Arndt et al. |
| 2002/0138650 A1 | 9/2002 | Yamamoto |
| 2003/0001774 A1 | 1/2003 | Harris |
| 2003/0182052 A1 | 9/2003 | DeLorme et al. |
| 2003/0195008 A1 | 10/2003 | Mohi et al. |
| 2003/0216145 A1 | 11/2003 | Cox et al. |
| 2004/0077359 A1 | 4/2004 | Bernas et al. |
| 2004/0110515 A1 | 6/2004 | Blumberg et al. |
| 2005/0091118 A1 | 4/2005 | Fano |
| 2005/0144049 A1 | 6/2005 | Kuzunuki |
| 2007/0069923 A1 | 3/2007 | Mendelson |
| 2007/0118280 A1 | 5/2007 | Uhlmann et al. |
| 2008/0132250 A1 | 6/2008 | Harris |

OTHER PUBLICATIONS

Stolowitz Ford Cowger LLP, "Listing of Related Cases", Jun. 13, 2011, 2 pages.

Location Services (Position Determination Service), Aug. 1999.

<time_since> 12.07 </time_since>
<cell_recap> AB07 </cell_recap>

FIG. 9C

POSITION PRIVACY IN AN ELECTRONIC DEVICE

This is a continuation of U.S. application Ser. No. 11/778,065 filed Jul. 15, 2007, which is a continuation of Ser. No. 10/714,096, filed Nov. 14, 2003, now U.S. Pat. No. 7,327,312, which is a divisional of U.S. application Ser. No. 09/682,600 filed Sep. 25, 2001 now U.S. Pat. No. 6,700,534, which is a continuation-in-part of U.S. application Ser. No. 09/690,001 filed Oct. 16, 2000.

BACKGROUND

The present invention defines a system for enhancing privacy in an electronic device with automatic position location detection.

Modern electronic devices often include automatic position location detection technology. For example, the modern cellular phone may include a satellite positioning system such as a GPS device. Other cellular phones, referred to as WAP phones, also automatically keep track of the users position.

Figure 1:
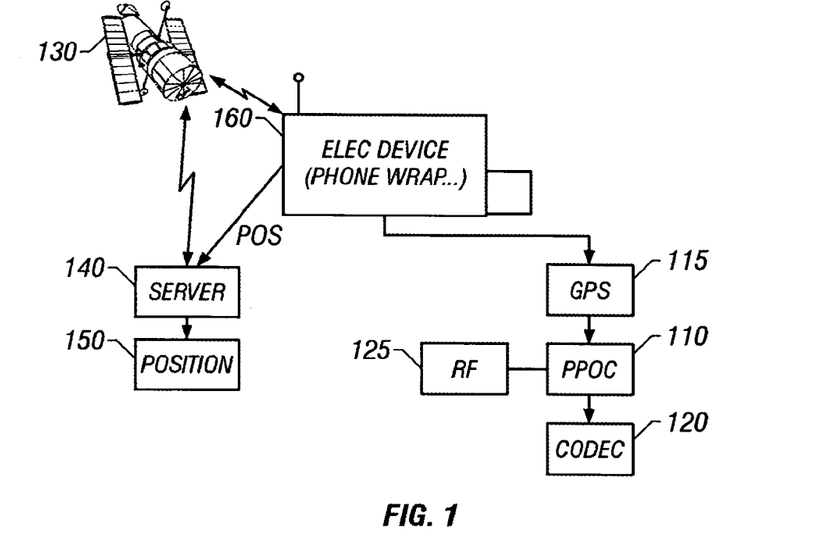
FIG. 1 shows a block diagram of an electronic device with a built-in automatic position location detection system.

FIG. 1 shows an electronic device 160, which can be a wap phone, regular cellular phone, or any other electronic device. The device is shown with electronic circuitry including electronic processor 110 which processes signals from both GPS device 115, and from a codec 120. The processor also controls an RF device 125.

The electronic device automatically determines its position. In this embodiment, it does so by communicating with a constellation of global position detecting satellites 130, for automatic determination of position. The electronic device may also communicate with the server 140, such as to a base station. The electronic device may communicate its determined position to the server. This may be done, for example, for emergency purposes. In the case of a WAP device, this may be done simply to monitor the position of the cellular phone. The server may output the position, shown as 150.

SUMMARY

The present application defines a device which enhances privacy in such a system. Specifically, the present application teaches a device which selectively prevents the electronic device from transmitting its position. This hence allows selection of an enhanced privacy mode.

BRIEF DESCRIPTION OF THE DRAWINGS

These and other aspects of the invention will be described in detail with reference to the accompanying drawings, wherein.

DETAILED DESCRIPTION

Figure 2:
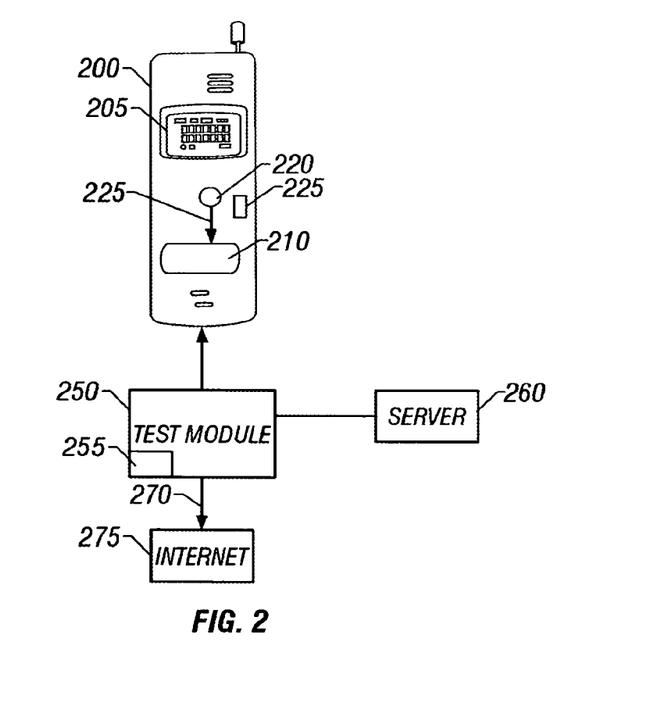
FIG. 2 shows a first embodiment of a privacy enhancing device for an electronic element.

The first embodiment is shown in FIG. 2. In this embodiment, the electronic device is a portable telephone such as a cellular phone. However, it should be understood that other electronic devices, such as computers, personal digital assistants, or any other device which is capable of communicating in any way, may use similar techniques to those disclosed herein. A portable phone 200 has a normal user interface 205, and other structure such as display, etc. The device also includes a positioning device 210. In this embodiment, a position detection block control 220 is provided. This is an actuation mechanism, such as a button, which can be pressed to deactivate the function of the positioning device 210. The unit's normal position forms an enable signal 225 which enables the position detector 210, allowing the position detector to determine its position, and report that position to a remote source, such as a base station. When the button is in its override position, an indicator 225 is illuminated, indicating the privacy mode has been entered. In this privacy-enhanced state, the enable signal is removed, thereby preventing position detector 210 from reporting its position.

A concern, however, is that some users, either hackers or others with more aura of authority, may use this system in a way which determines position surreptitiously, e.g., even when the button is placed on override. For example, law-enforcement officials might use this system to keep track of someone without their knowledge. One way to do this might be to fake an emergency call or the like. Doing this, however, may have serious privacy implications.

If a manufacturer includes a "back door" into the system, that "back door" might be used to determine the position of a person, without their authority or knowledge.

A test module 250 can be used to test the degree of privacy associated with the electronic device. This test module is connectable to the server 260. It also runs a software layer 255 which can be updated via channel 270, e.g., over the Internet. The test module 250, in operation, communicates with a service over the internet. The service employs experts to research and store the latest and most up-to-date way of improperly obtaining position in such a system. This is available via update 270 from the Internet. This may be carried out as a subscription service, in a similar way to the operations currently done to update virus definitions. The Internet returns ways of hacking the position detection prevention, which can hence be used by the test module to evaluate the privacy provided by the actuation 220.

The test module sends a request for position location to the phone 200, using the best available techniques. The phone returns information, and this information is evaluated by the server 260. Server 260 returns an evaluation of the operation to the test module 250. This can provide a user with an indication of the level of privacy they have obtained.

Figure 3A:
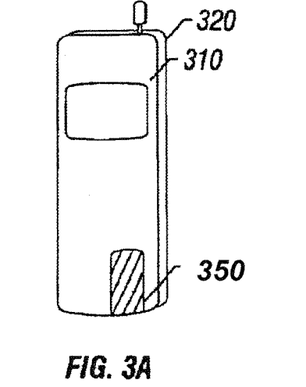
FIGS. 3A and 3B show a passive version of the privacy enhancing device using an RF blocking technique.
Figure 3B:
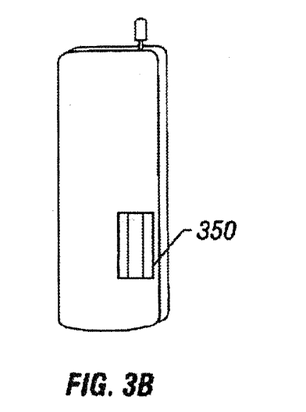

Another embodiment is shown in FIGS. 3A and 3B. This embodiment may be most usable with a satellite positioning system in a telephone. In this kind of phone, both sets of electronics—the GPS and the codec—may use a common processor. However, a GPS system often requires a separate antenna. The separate antenna may be very sensitive to reception. For example, while cellular telephones can often be used indoors, corresponding GPS devices may not be usable in the same situations. Moreover, each separate telephone type will have a GPS antenna placed in a specified location. There are relatively few telephone types in common use, usually less than 50 types. This system finds, for each telephone type, where the GPS antenna will be placed. The device 350 is made of an RF absorbing or reflecting material such as metal. The device is also made in a way which allows it to be temporarily attached to the telephone, e.g., by clipping on to the phone. For example, the device may fit on both sides of the telephone 310 and 320 and wrap around the telephone to cover areas adjacent the antenna on both of the surfaces. The cover 350 covers both sides of the antenna, and therefore prevents GPS operation while the cover is clamped into place. In this way, privacy can be effectively temporarily enhanced. FIGS. 3A and 3B show two different places where the shield could be attached; but it should be understood that the shield could be attached in many different places.

One of the stated uses of GPS in a portable phone is for use in an emergency. When the user dials 911, the GPS device allows the emergency authorities to determine the user's precise location. In order to allow this, the cover can be maintained in place during all operations other than emergencies. During emergencies, the cover can be removed. But once the cover is removed, the position of the electronic device can be automatically detected, as usual.

Figure 4:
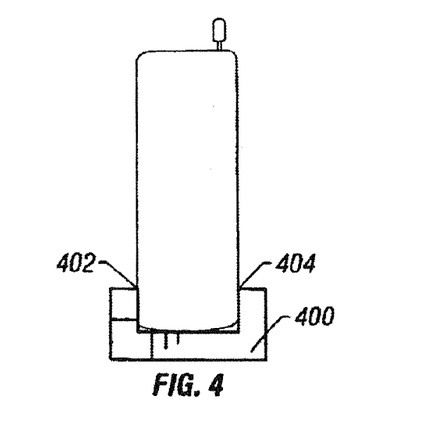
FIG. 4 shows an active jammer device which actively produces a signal to prevent the reporting of position.

The system of FIGS. 3A and 3B may not work with certain phones. An alternative system is shown in FIG. 4. In this phone, an active jammer module 400 is provided. The jammer module either supplants or fools the system into obtaining false position information. For example, the jammer module may provide false satellite information, e.g., indicating a false satellite position.

Satellite positioning system information is often provided in broad spectrum noise. The jammer 400 may produce broad spectrum noise, which includes information indicative of three satellites, but which is transmitted at a sufficiently low power to be receivable only at a very short range. In the system of FIG. 4, the jammer can also be attached using attachment clips 404. The attachment can place the transmitter of the jammer in close proximity with the satellite positioning system antenna 402.

The jammer information can produce outputs that indicate a false location, for example. Similar operations can be carried out with WAP phones. In a WAP phone, for example, the system may override the carrier, or tell the carrier false information about where the phone is located. This may include providing false triangulation information into the system or the like.

Figure 5:
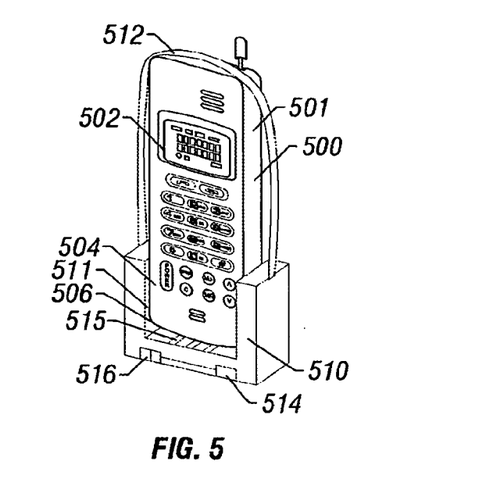
FIG. 5 shows an exemplary jammer which produces fake pseudoranges, to fool the satellite positioning device.

An example of the above-discussed jamming and shielding technique is illustrated in FIG. 5. It is recognized that the antenna which receives the automatic positioning information may be relatively sophisticated and may be difficult to adequately shield. The portable telephone 500 includes, as conventional, display 502, and user interface 504 which enables communication with the telephone electronics. The telephone may also include a connector 506 which may often connect to receive power and includes the capability of connection with the power in the telephone and possible communication with the telephone.

The interface device 510 may be shaped to couple against the phone. For example, the interface device may have inner surfaces 511 which are adapted to be pressed against outer surfaces 501 of the telephone housing. In addition, the device may include a strap 512 which connects across another portion of the telephone housing, to hold the interface device 510 surfaces against the phone surfaces. The interface device 510 may include a shielding function, and may also include a position jamming function that is embodied as electronics within the housing of the interface device 510. The strap itself may also carry out a shielding function; i.e., it may be formed from a metallic material to shield against certain receptions.

The electronics, shown generically as 514, may be powered either from the connector areas 515, or from a replaceable battery 516.

In operation, this system may jam certain communications indicative of the device's location. The global positioning system may for example be a satellite positioning system. These systems, as conventional, may receive contact signals from satellites in which the "pseudoranges" are embedded within noise or other random information within the satellite signal. Hence, the electronics 514 produce false pseudoranges. This false pseudorange information is received by the telephone device 500. The real pseudorange information is received by these devices at relatively low-power. Accordingly, producing even % watt or less of pseudorange information from the jamming device 510 may completely overwhelm the real pseudoranges that are incoming from the satellite. For example, the pseudoranges may be programmed to always indicate specified locations such as the North Pole. As an alternative, the pseudoranges may be randomly selected, with the random values being inserted as fake pseudoranges. The jamming device thus forces the unit to indicate a different location.

In another embodiment, the electronics 514 may include a processor running a specified program. That program may select a pseudorange representing a specified location at random. Then, once the pseudorange is selected, the location being represented by the pseudorange, and thus by the phone, may continually appear to move. This may simulate the user actually moving along a path within the 'fake' specified location.

Figure 6:
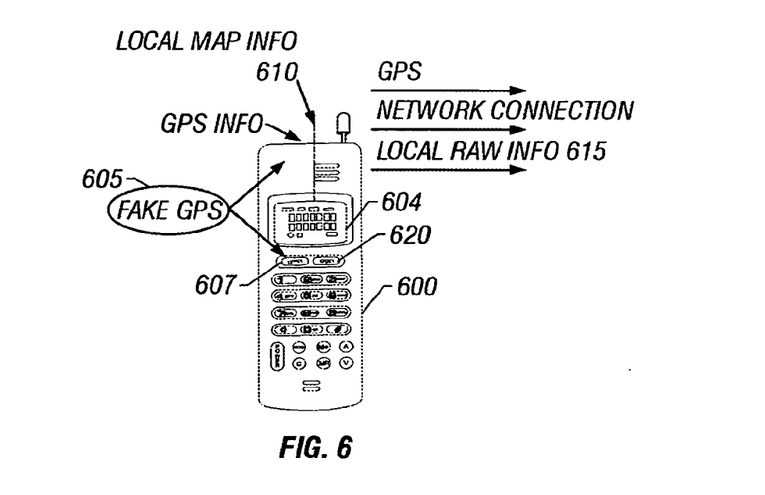
FIG. 6 shows an alternative position detecting device, in which environmental clues may be used to enhance the position detection.

FIG. 6 shows an alternative embodiment in which position detection and monitoring may be augmented by additional operations carried out over a network. In this embodiment, the GPS computer 600 may be a relatively thin client. Examples of thin clients which may operate in the FIG. 6 embodiment may include a cell phone, or a personal digital assistant "PDA". In addition, other wireless devices such as laptops and other network capable computers may be used as the computer 600.

It has been difficult to use such a thin client to carry out navigation assistance in any but the most superficial of ways. In this embodiment, communication over the network may be used to improve this operation.

The positioning information may include information obtained from GPS satellites, and information obtained from other positioning elements such as repeaters and transponders. It may also include other kinds of tracking information such as the Syptech Local Positioning System (Syptech.com). For example, the block generically shown as 605 in FIG. 6 may include transponders that produce "simulated" GPS information and transmits that simulated information to the computer 600. The transponder may transmit pseudorange information of the type that would be received by GPS receivers, but at a higher power level than could be received from the actual GPS satellites. Alternatively, it may transmit this information in locations which are otherwise shielded against such satellite communications, such as indoors or under tree cover. The transponder 605 may also include bluetooth transponders which may transmit directly to a bluetooth receiver 607 within the phone 600. This system may also use a messaging service or web service to send the information. A "bluetooth blip" may also be used to convey location information.

The location of the transponder may be known, or alternatively, the transmission itself may include information indicative of its information.

Environmental information may also be used to provide clues about the specific location of the device 600.

On a thin client such as 600, the operations that can be done using the GPS information is often limited by the limited resources of the thin client. Many such thin clients simply do not include enough memory and/or resources to store all of the map information which may be necessary for navigation over an extended route, for example. For example, a PDA or cell phone might have some fixed small amount of memory, say 8 megabytes. However, navigation or position determination in any desired area may require much more than that limited amount of resources.

Accordingly, in this embodiment, the rough positioning information is used to download positioning information, e.g. map information, over the network connection. Local positioning information is downloaded at specified intervals, e.g., every time the unit moves more than 50 feet. The downloaded information may include additional information in the direction of travel, and instructions to delete or ignore certain information that is not within the direction of travel. Alternatively, an entire new subset of information may be downloaded at any time. In this way, the stored information continually changes as the unit moves. Each new batch of stored information corresponds to a unit of stored information around the current unit position. As the unit moves, the information is continually updated to a new batch of information, centered around the current location.

The local map information is shown as 610, and is received over the network connection as dynamic information, which is stored into the memory 604. This dynamic map information will be later replaced by new map information, indicative of some new area.

Use of dynamically changing positioning information may minimize the amount of local resources which are necessary for navigation. Of course, a core of navigation information may be necessary, which may correspond to very rough information about positioning, as well as location information from previous movements, for example.

In this embodiment, the client may also transmit local "raw" information. The raw information may include information about the environment, from which clues may be derived. These clues may be compared with a database, having a list of clues for the specific areas.

One example of environment information may include the speed of the device. If the user is going faster than a specified amount, (say, faster than 30 miles per hour), then this clue may indicate that the user is on a road, and information from the map may be used to narrow down the current location to a position of such a road. Of course, the specific road must be determined and may be selected from the other clues. Other clues may include time since a GPS fix. Various parameters may affect the ability to obtain a GPS fix. This may include, for example, trees covering the roadway, as well as tunnels. These clues may help narrow down the user's location also.

Other environmental information may include the power and/or type of cellular reception.

The server which receives this information may include a database with information about cellular reception in various areas.

Another form of environmental information may include a database indicating specified types of interference from various environmental factors. Each specified type of interference may have a specified different kind of signature. For example, the hum from a power line may be one kind of signature; noise and/or interference from a train, power generating station, or radio transmitter may represent another kind of signature. The unit may monitor for different kinds of noise, and send information about the noise that is received.

If the client receives cellular or other type information, then information about the different base stations or receivers/transmitters which are communicating with the client may be reported, for example, their ID numbers or other identifying information. The raw amount of received power may also be reported.

To the extent that the thin client is also aware of its surroundings, information from that awareness may also be reported. For example, if the client has a microphone, then various information about the sounds it is hearing may be transmitted. If a camera is present in the client, then information from the camera may be sent. This information may be detailed, that is it may include enough information to determine actual features, or may be very coarse. Coarse information might only indicate the degree of light or dark, and/or information about outlines of specific objects.

The client which is used may be a Web service, for example, or may be via communications with the user's cellular telephone company. In any case, the information may preferably be sent in a specified form type format.

Figure 7:
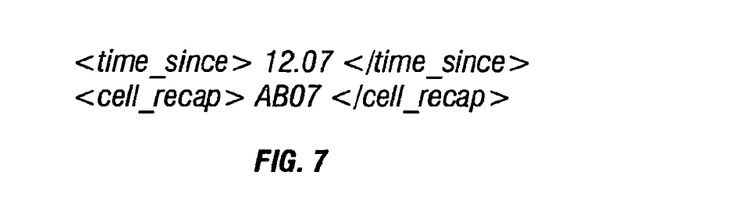
FIG. 7 shows an XML form which may be used to report information about the environmental clues.

For example, FIG. 7 shows the information being sent as an XML form with various tags representing the various raw data which can be sent. This allows the clues to be transmitted in an organized form. Although an XML form is described herein, it should be understood that other forms could alternatively be used. The use of an XML form, however, may produce special advantages. For example, as shown in FIG. 7, different tags may be provided to indicate the kind of information that is being sent. As explained above, various different environmental clues may be provided. Each of these clues may be associated with an XML tag. For example, a form might include only tags (e.g., <noise> parameters </noise>) for those parameters which were available. Alternatively, the form a may include all possible tags, but no data in between those tags unless information about that data is sensed.

In each of these embodiments, the details about positioning of the thin client may be enhanced by comparison to a database of information about various characteristics. The database may include characteristics as a function of position. A unique combination of certain characteristics may indicate a position unambiguously, especially if coarse positioning from other operations has indicated a rough location.

In another embodiment, this same database may be stored locally, and clues about the environment may be used to enhance determination of position locally.

An advantage of this system is that it determines position using many of the same clues that are used by a human operator who attempts to determine their position. The human operator often looks for familiar landmarks and other items. In a similar way, this system may attempt to determine the current position based on clues which may be analogous to landmarks.

In another embodiment, the positioning operation is only allowed to operate in an emergency. For example, the user may signify an emergency, which turns on all of the different clue-reporting positioning systems that are disclosed herein. This may be done to enhance the user's privacy to the extent possible.

The ability for a thin client to monitor position produces several possible advantages. The embodiment of FIG. 6 may also include a special control 620, referred to herein as a "Hansel and Gretel" ("HG") control. When the HG control is actuated, the current location of the device is stored as a bookmark/stored location to be used later. The store and retrieval process may follow the flowchart of FIG. 8. The control is shown as being actuated at 800. At 802, the system determines if information is already stored in the memory. Note that this determination may be used only for a single bookmark system, and the flowchart may operate differently in other embodiments in which multiple items are stored. If information is not stored in the memory at 802, or if this is a system where multiple bookmarks can be stored, then the current location/coordinates are stored at 805. This storage location may store either the exact location, or a best guess about the location, obtained from any of the embodiments above, including GPS information as improved using the clues about the environment.

In this embodiment, the information may be used as a bookmark. That is, the actuation of the control causes current coordinate information to be stored in the memory. The next actuation retrieves this data from the memory and uses it to navigate or guide the user back to the location.

The later retrieval from the memory is shown by the left flowchart side in FIG. 8. When information is detected to be stored at 802, then at 810, the computing element retrieves the stored coordinates. Those coordinates may then be processed. 812 represents processing those coordinates using the techniques described above, that is transmitting them to a remote server which may calculate the mapping information, and return at 813, data to be used in plot coordinates. At 815, the operation plots the course to the coordinates, which may include displaying a map and the like. Navigation continues at 820.

Figure 8:
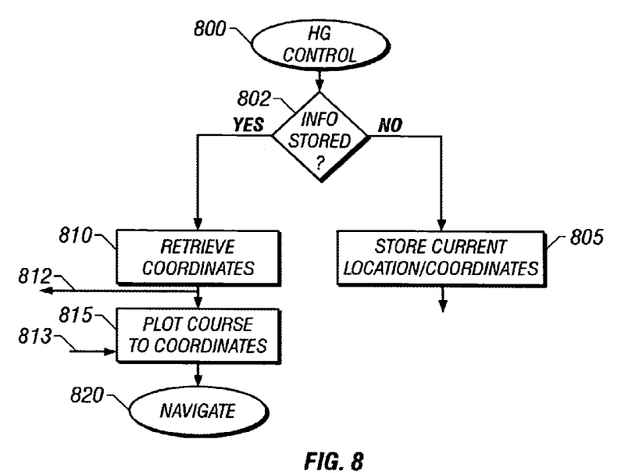
FIG. 8 shows an embodiment where current position may be stored and allowed to be used to later return back to that current position.

The retrieval bookmark may use the same HG control as shown in FIG. 8. That is, the first press stores the location in the memory, and the second press retrieves the location from the memory.

Alternatively, multiple different bookmarks may be stored and labeled by some descriptive information in the memory. In this embodiment, 802 may be replaced by an operation where one of multiple stored items is selected for navigation.

This may have significant advantages when used in an unfamiliar location. For example, a user may store the location of their hotel, and be relatively assured that they will be able to return to the hotel later, using the bookmark function. Pressing the button effectively provides a return path to the location, much like the trail of bread crumbs left in the Hansel and Gretel fairy tale.

Analogously, this may also be used to guide the user back to their rental car drop-off facility, or to the airport, or to any other location.

In another embodiment, the thin client 600 has Web browsing capability, or more generally has access to a source of information over its network connection. An analogous position control to the HG control that is described above may be used over the Internet as part of the client's reception of information from the Internet network.

For example, the user may find a desired item or location. The user may, for example, find a desired restaurant or hotel from a remotely accessible database. The description of the restaurant or hotel may include a description of the location in a form that can be understood by a navigation device. A position control may be used to enter the address or coordinates of the item as a bookmark to be retrieved later.

Alternative Web uses for the position control may include entry of an address. For example, the address may be entered into the client and later retrieved.

Alternatively, information indicative of a place may be acquired, and used as part of a message. A desired meeting place may be acquired, and translated into a form which can be understood by another positioning device, which can be coordinates or a physical address. A message with a request for meeting as well as coordinates for the meeting may then be transmitted. At the remote end, the coordinates associated with the message may be retrieved and used to control a navigation system.

Figure 9A:
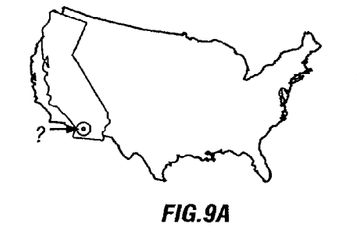
FIGS. 9A-9C show a graphical user interface for a portable GPS device.
Figure 9B:
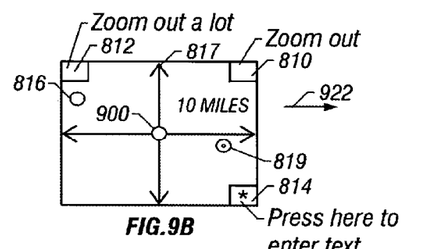
Figure 9C:
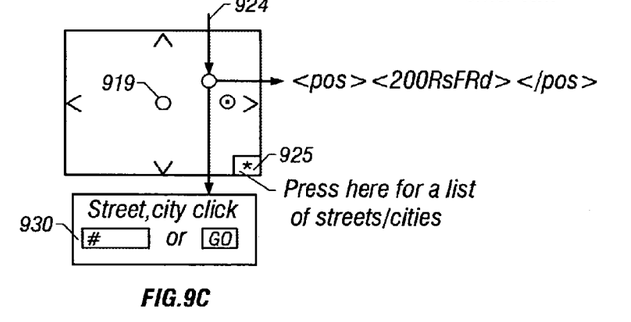

An alternative embodiment shown in FIG. 9A-9C may operate with a navigation system of the type described above, and may allow selection of a desired location using a graphical user interface. FIG. 9A shows a process of displaying a local area map centered in the user's current area.

The graphical selection embodiment may start with the view shown in FIG. 9A, which shows a rough map of the entire area. This may represent either the entire area that can be navigated, or only a portion of that area. The user can select an area shown as "?" by clicking, which brings up the menu of FIG. 9B. FIG. 9B shows a zoomed area, centered around the selected location 900, e.g. 10 miles in each direction. The exact extent of the area may depend on the scale of the map of FIG. 9A. As an alternative, the map of FIG. 9B may be initially shown, with options to allow the user to expand the scale of what they view. For example, the control 810 may command zoom out, with 812 commanding "zoom out a lot". At any point, the user may press the control 814 to bring up a script, e.g. a JavaScript, enabling the user to enter text.

In order to facilitate navigation, the user may be provided with landmarks. For example, the user may be shown different cities within the selected area. In FIG. 9B, the user sees such cities such as Oceanside Center, as 816. Arrows are also provided such as 817 enabling the map view to be rotated. The user may also be shown other common landmarks such as shopping centers and other items which enable the user to better get their bearing.

In an embodiment, again the GPS device may store a minimal amount of information in order to facilitate operation on a thin client. Therefore, each time the user executes any of the clicks discussed above, the contents of the click, shown as 922, are sent as a form to a Web service. As above, the form may be in XML format, with specified tags indicating the content and format. In FIG. 9B, the user has tagged the location 819. Therefore, a new area tag, along with general coordinates of the new tagged area, are sent as XML information to the Web service that handles the navigation operation. The Web service returns information at 924 (FIG. 9C). This includes a recentered map now centered around the selected point 919. The recentered map shows detailed streets that are as close to the point 919 as possible. Each street may be associated with a screen tip. Placing the cursor over the street may bring up a screen tip or other information on the screen showing the additional buttons for movement.

A pulldown menu having a list of streets and cities are provided as 925. If the user selects the pulldown menu, it provides a list of all the streets within the new map area, shown as 930. The streets may be arranged alphabetically, by distance to the actual selected point, or by some other criteria. This enables the user to select one of those streets.

In the embodiment of FIG. 9C, the user has selected one of the positions. This information is sent as a form (e.g. an XML form) to a Web service. The Web service then returns map information for the desired route in a form that can be used by positioning equipment on the PDA. By using a standardized form of this type, any of a number of different Web services, which may be geographically distributed for example, may be used for the navigation operation. That is, since a standardized form is used, the information can be easily exchanged between multiple different Web services or other services which provides sources of information.

Although only a few embodiments have been disclosed in detail above, other modifications are possible. For example, any different kind of thin computer can be used, such as a phone, or a PDA. While the above describes the use of the information being for navigation, other uses of this kind of information can be used.

What is claimed is:

1. An apparatus comprising:
   means for detecting information indicative of a current location of the apparatus;
   means for determining the current location based, at least in part, on the detected information;
   means for transmitting current location information;
   means for enabling a privacy mode, wherein the current location information is prevented from being transmitted in response to the privacy mode being enabled; and
   means for communicating in the privacy mode.

2. The apparatus of claim 1, wherein the apparatus comprises a mobile communication device, and wherein the mobile communication device is configured to communicate while the transmission of the current location information is being prevented.

3. The apparatus of claim 2, wherein the means for enabling further comprises means for disabling the privacy mode, and wherein the mobile communication device is configured to communicate while the current location information is being transmitted.

4. A memory device having instructions stored thereon that, in response to execution by a processing device, cause the processing device to perform operations comprising:
   detecting information indicative of a current location of a mobile communication device;
   determining the current location based, at least in part, on the detected information;
   transmitting current location information;
   enabling a privacy mode associated with the mobile communication device; and
   preventing the current location information from being transmitted in response to the privacy mode being enabled, wherein the mobile communication device is able to communicate in the privacy mode.

5. The memory device of claim 4, wherein the mobile communication device is able to communicate while the current location information is prevented from being transmitted.

6. The memory device of claim 4, wherein the operations further comprise:
   sending the detected information over a network; and
   receiving a response over the network which includes additional information associated with the detected information, wherein said determining the current location comprises determining the current location based, at least in part, on the additional information.

7. The memory device of claim 4, wherein the detected information is sent over the network at intervals set by a distance of movement of the mobile communication device.

8. The memory device of claim 4, wherein the additional information comprises global positioning system (GPS) information and simulated GPS information.

9. The memory device of claim 4, wherein the additional information comprises mapping information and points of interest.

10. The apparatus of claim 1, wherein said means for detecting information comprises means for identifying an emergency situation, and wherein the current location of the apparatus is determined in response to identifying the emergency situation.

11. The apparatus of claim 1, further comprising means for identifying an emergency situation, wherein said means for detecting comprises means for detecting the information indicative of the current location of the apparatus in response to identifying the emergency situation.

12. The apparatus of claim 1, further comprising means for detecting positional information associated with the apparatus, and wherein said means for determining comprises means for determining the current location based on both the positional information and the detected information.

13. The apparatus of claim 12, wherein said means for detecting positional information is configured to receive information from a non-satellite source indicative of global positioning information that provides simulated information indicative of global positioning information.

14. The apparatus of claim 1, further comprising means for detecting global positioning system (GPS) information associated with the apparatus, wherein the detected information comprises non-GPS information, and wherein said means for determining comprises means for determining the current location based on both the GPS information and the non-GPS information.

15. The apparatus of claim 1, wherein said means for detecting information comprises means for identifying an emergency situation, and wherein the current location information is prevented from being transmitted prior to detecting the emergency situation.

16. The apparatus of claim 1, wherein the detected information comprises map information.

17. The apparatus of claim 1, wherein the detected information comprises points of interest.

18. The apparatus of claim 1, further comprising:
   means for storing the current location of the apparatus, wherein said means for determining comprises means for determining a new location of the apparatus; and
   means for displaying navigational instructions from the new location to the current location.

19. The apparatus of claim 18, wherein said means for displaying comprises means for displaying the navigational instructions in response to receiving a user input.

20. A method, comprising:
   detecting, by a mobile communication device, information indicative of a current location of the mobile communication device;
   determining, by the mobile communication device, the current location based, at least in part, on the detected information;
   transmitting, by the mobile communication device, current location information;
   enabling, by the mobile communication device, a privacy mode associated with the mobile communication device; and
   preventing, by the mobile communication device, the current location information from being transmitted in response to the privacy mode being enabled, wherein the mobile communication device is able to communicate in the privacy mode.

21. The method of claim 20, further comprising:
   sending the detected information over a network; and
   receiving a response over the network which includes additional information associated with the detected information, wherein said determining the current location further comprises determining the current location based on the additional information.

22. The method of claim 20, further comprising identifying an emergency situation, wherein the current location of the apparatus is determined in response to identifying the emergency situation.

23. The method of claim 20, further comprising detecting positional information associated with the mobile communication device, wherein the current location is determined based on both the positional information and the detected information indicative of the current location.

24. The method of claim 20, further comprising detecting global positioning system (GPS) information associated with the mobile communication device, wherein the detected information comprises non-GPS information, and wherein the current location is determined based on both the GPS information and the non-GPS information.

25. The method of claim 20, further comprising:
- storing the current location of the mobile communication device;
- determining a new location of the mobile communication device; and
- displaying navigational instructions from the new location to the current position location.

* * * * *